United States Patent [19]

Lin et al.

[11] Patent Number: 5,305,168
[45] Date of Patent: Apr. 19, 1994

[54] THIN FILM TRANSDUCER SUSPENSION ASSEMBLY WITH FLEXURO MOUNTED BOOSTER ELEMENT

[75] Inventors: Fong-Jei Lin; Shengbo Zhu, both of San Jose, Calif.

[73] Assignee: Magnex Corporation, San Jose, Calif.

[21] Appl. No.: 847,770

[22] Filed: Mar. 5, 1992

[51] Int. Cl.$^5$ ............................................. G11B 5/48
[52] U.S. Cl. ................................. 360/104; 360/108
[58] Field of Search ........................... 360/103–104, 360/108, 126

[56] References Cited

U.S. PATENT DOCUMENTS

| | | | |
|---|---|---|---|
| 4,317,149 | 2/1982 | Elser et al. | 360/126 |
| 4,458,279 | 7/1984 | Katz | 360/123 |
| 4,745,506 | 5/1988 | Nakamura et al. | 360/126 X |
| 4,787,003 | 11/1988 | Nakamura et al. | 360/123 |
| 4,927,804 | 5/1990 | Zieren et al. | 360/126 X |
| 5,014,145 | 5/1991 | Hosokawa et al. | 360/104 |
| 5,027,239 | 6/1991 | Hagan | 360/104 |
| 5,055,969 | 10/1991 | Putnam | 360/104 X |
| 5,072,324 | 12/1991 | Lin et al. | 360/126 |
| 5,103,359 | 4/1992 | Marazzo | 360/104 |
| 5,121,273 | 6/1992 | Slezak | 360/104 |

*Primary Examiner*—John H. Wolff
*Attorney, Agent, or Firm*—Graham & James

[57] ABSTRACT

A miniature signal booster element is inserted into the conductive path along a pair of wires leading between the slider end of a flexure member in a disk drive and the mounting end of the flexure. The signal booster element comprises an integrated circuit amplifier or a ferrite core transformer. The ferrite core transformer may comprise two separate coils: one coupled to the transducer and the other coupled to the output side of the wire pair; or a single coil with an intermediate tap connection. The signal booster element is single coil with an intermediate tap connection. The signal booster element is encapsulated within an electrically insulative sheath to provide electrical insulation and mechanical isolation of the signal booster element from the flexure member.

12 Claims, 2 Drawing Sheets

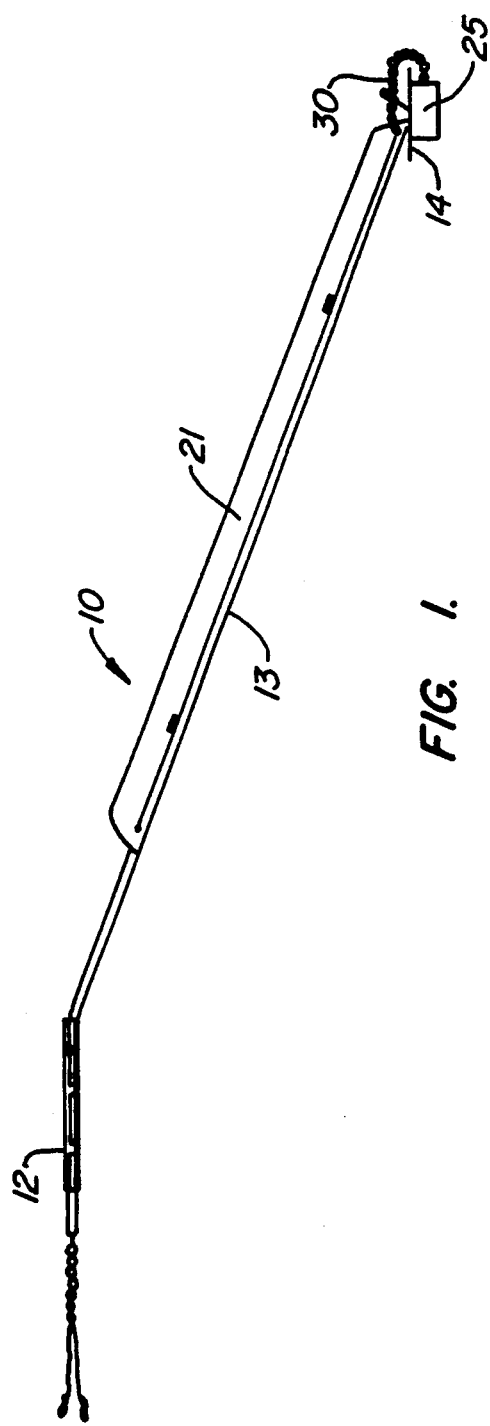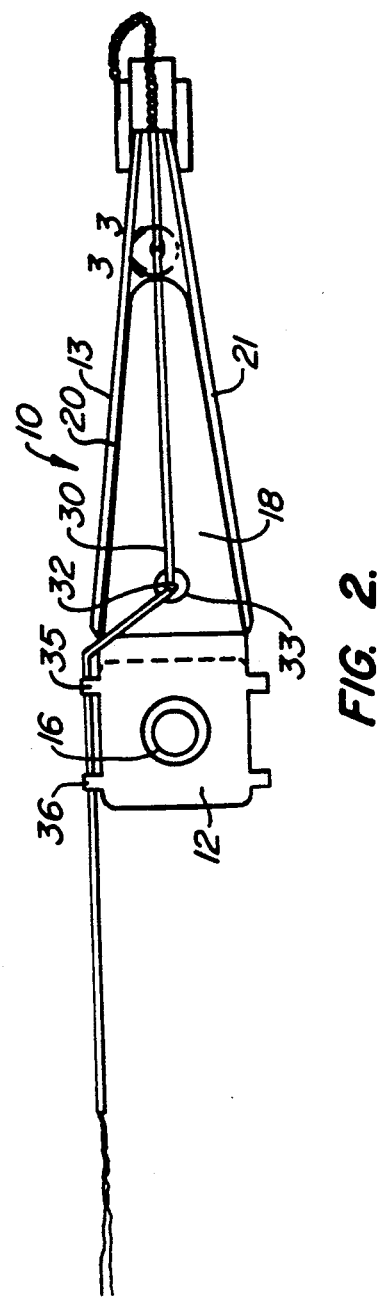

THIN FILM TRANSDUCER SUSPENSION ASSEMBLY WITH FLEXURO MOUNTED BOOSTER ELEMENT

BACKGROUND OF THE INVENTION

This invention relates to miniature transducers and signal booster elements used in small computer disk drives.

Miniature transducers are known which are used in disk drives to write data to and read data from magnetic storage disks. One such miniature transducer type is a thin film magnetic transducer, which comprises a pair of pole pieces joined at a first region, usually termed the back gap region, and spaced at an opposing region, usually termed the pole tip region. In between the back gap region and the pole tip region, the pole pieces diverge in order to accommodate an electrical coil which is electrically insulated from the pole pieces. The coil is electrically connected to associated read/write circuitry. The transducer is typically fabricated on a relatively thick substrate, usually termed a slider, with the pole tip region terminating at a surface termed the air bearing surface (ABS). A typical example of such a transducer is described and illustrated in U.S. Pat. No. 4,458,279 and the additional references cited therein, the disclosures of which are hereby incorporated by reference.

Another miniature transducer type is termed a composite magnetic transducer, which is shown in co-pending, commonly assigned U.S. patent application Ser. No. 07/772,981 filed Oct. 7, 1991, the disclosure of which is hereby incorporated by reference. Essentially, a composite magnetic transducer comprises a two piece magnetic core element fabricated from a suitable material, such as ferrite, which is formed separately and then glass-bonded to a hard ceramic slider. The ferrite core element is bonded to the same surface as the support surface on which the thin film transducer is formed, the ferrite core being bonded to an ABS rail lobe or in a position intermediate the two spaced lobes. The ferrite core element has a gap which functions in a manner similar to the pole tip region of a thin film magnetic transducer, with the gap dimensions being defined by the glass bonding material and the process employed. An improvement over the composite head is termed the MIG head, which is an abbreviation for metal-in-gap. In this type of miniature transducer, a thin film of metal (typically Fe-Al-Si) is provided in the gap on the gap confronting surface of the downstream ferrite core piece. This arrangement provides for improved performance in general. Two typical examples of MIG heads are described and illustrated in the publication entitled "Recording Characteristics of MIG Heads", Shinohara, et al., IEEE Transactions on Magnetics, Vol. 24, No. 6, November, 1988, pages 2626–2628, and the additional references cited therein, the disclosures of which are hereby incorporated by reference. In all such composite heads, the ferrite core has an aperture, and a multi-turn coil of wire is wound about the core through the aperture, the coil being electrically connected to the associated read/write circuitry.

The demand for increasing data density on magnetic media has led to the requirement for substantially smaller track widths and transducers with correspondingly smaller gap dimensions. With decreasing gap size, the amplitude of the signal output by the transducer coil is corresponding reduced. This is undesirable, since noise signals increasingly mask the data signals generated by the coils during a read operation, which leads to erroneous data retrieval. In the past, attempts have been made to compensate for this decrease in signal amplitude by adding more turns to a transducer coil. For thin film transducers this solution is less than desirable, however, since it leads to an increased thickness of the transducer: in particular, in order to accommodate more turns, the coil is fabricated in several layers. This increased thickness of the transducer is highly undesirable because of a corresponding increase in noise, resistance and power consumption. Moreover, additional process steps are required, which increase production cycle time and decrease the yield rate, thereby contributing to higher cost per unit. For composite transducers, the additional turns solution is less feasible, since the coil is composed of individual turns of a continuous wire which cannot be decreased in diameter without sacrificing tensile strength, which leads to greater difficulty in fabricating such transducers and a lower manufacturing yield.

An improvement in the signal amplitude generated by such miniature transducers has been afforded by the use of a miniature thin film transformer to boost the electrical signal output from the thin film transducer. In our U.S. Pat. No. 5,072,324, issued Dec. 10, 1991 for Thin Film Transducer/Transformer Assembly, the disclosure of which is hereby incorporated by reference, a suitable thin film transformer is described which is formed on one of the two slider lobes in the position normally occupied by one of the thin film transducers in the prior art devices. This thin film transformer includes a bottom pole member, a top pole member forming a closed magnetic path with the bottom pole member, and a coil. The top and bottom pole members are fabricated of a magnetically permeable material. The electrically conductive coil is positioned between the top and bottom pole members, the coil having a pair of ends and a tap connection between the ends. The bottom pole member of the transformer includes first and second end portions and an intermediate body portion extending therebetween. The top pole member includes first and second end portions and an intermediate body portion extending therebetween and disposed above the intermediate body portion of the bottom pole member to provide an interior space for accommodating the coil, and the first and second end portions of the bottom pole member are coupled to the first and second portions of the top member, respectively. In addition to being located on one of the two lobes, the transformer can also be positioned elsewhere on the same substrate as the thin film transducer, or can be formed as a separate unit. The transformer coil is electrically connected to the transducer coil and to the follow on electrical circuitry by means of conductive leads. Like the transducer, the thin film transformer is fabricated using integrated circuit fabrication techniques.

The above-referenced co-pending U.S. patent application Ser. No. 07/772,981 discloses a further extension of the invention disclosed and claimed in the U.S. Pat. No. 5,072,324 by substituting a discrete booster element for the monolithically formed thin film transformer, the signal booster element having a pair of input terminals and a pair of output terminals. A coupling means is provided which includes a first conductive path coupled between one of the transducer coil ends and one of the signal booster element input terminals, and a second conductive path coupled between the other one of the transducer coil ends and the other signal booster element input terminal. The output signals from the transducer/signal booster assembly are taken from the output terminal of the signal booster element. The signal booster element may comprise a thin film transformer as described in the above-referenced '324 patent or an integrated circuit amplifier. In either form, the signal booster element serves to boost the amplitude of the signal generated by the transducer coil, with the amount of amplitude boost being dependent upon the turns ratio of the two portions of the transformer or the gain of the amplifier. The transducer and the signal booster element are supported by the substrate/slider in closely adjacent fashion, either on the same surface or on different surfaces. Each of these two major elements may be formed either independently or (in the case of the thin film transducer and transformer or integrated circuit amplifier embodiments) concurrently.

While the above describe signal amplitude arrangements provide improved performance for miniature transducers in small computer disk drives, these arrangements can only be applied to existing transducer/slider designs by changing the manufacturing process, which is not always economical to do for well established designs. Consequently, the need exists for a signal booster which is directly compatible with existing transducer designs, amenable to use with future designs and which is relatively inexpensive to implement.

SUMMARY OF THE INVENTION

The invention comprises a discrete separated signal booster which is compatible with many existing transducer designs, can be implemented at relatively low cost, and which provides a signal amplitude improvement to existing miniature transducers.

In its broadest aspect, the invention comprises the addition of a separate and discrete booster element, such as a ferrite core transformer or an integrated circuit amplifier into the path of the signal conductors extending between the slider mounting end of a flexure assembly and the opposite mounting end of the flexure assembly so that the amplitude of the signal voltage generated by the transducer is boosted in the region adjacent the transducer slider but remote from the follow on disk drive electronic circuitry. In the preferred embodiment, this is accomplished by using a ferrite core transformer having either a single core winding with an intermediate tap or a pair of individual core windings. The windings are connected respectively to the output conductor terminal pads on the transducer/slider assembly located at the transducer end of a conventional flexure member, and to the output side of the conductor pair normally coupled to the follow on electronic circuitry. The ferrite core transformer is a miniature transformer small enough to be mounted on the flexure member without adversely affecting the mechanical support characteristics of the member. Preferably, the transformer is surrounded by a protective sheath formed of a suitable electrically insulative material, such as a heat shrink tubing material, so that the transformer is protected both electrically and mechanically. The transformer may be assembled to the conventional conductor pair, surrounded by the tubing and then mounted to the flexure member as a unit.

The invention provides a convenient, low cost improvement for boosting the signal amplitude of the voltage generated by a miniature transducer in a disk drive, without requiring any alteration of the conventional mechanical flexure mounting member normally used in conjunction with such thin film transducers in a disk drive environment. Thus, no redesign of the slider or transducer is required in order to obtain the advantages of the invention.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a side elevational view of a flexure member incorporating the invention;

FIG. 2 is a top plan view of the flexure element of FIG. 1;

DESCRIPTION OF THE PREFERRED EMBODIMENTS

Figure 3:
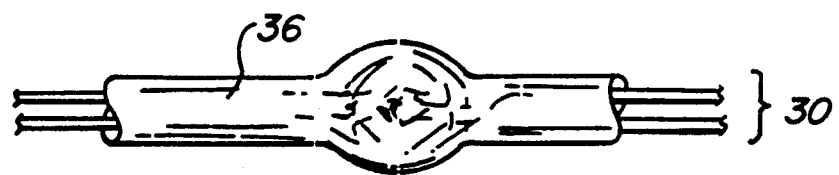
FIG. 3 is an enlarged view of a portion of the tubing indicated in FIG. 2 with the reference numeral 3—3.

Turning now to the drawings, FIG. 1 illustrates a flexure member 10 incorporating the invention. As seen in this Figure, a conventional flexure member 10 has a mechanical mounting end portion 12, a central body portion 13 and a slider mounting platform end 14. As best seen in FIG. 2, mounting end portion 12 has a central aperture 16 adapted to receive a suitable mounting fastener (not shown) for mounting the flexure 10 to the associated disk drive motion mechanism for maneuvering the flexure member over the recording surface of the associated disk (not illustrated). The central body portion 13 of flexure 10 has a flat tapering floor portion 18 and a pair of upturned side flange portions 20, 21 which provide additional stiffness to the flexure member 10. Floor portion 18 tapers as illustrated in FIG. 2 to a narrow lower end terminating in a small rectangular platform end 14 on which a conventional slider 25 is mounted. Slider 25 carries a thin film transducer of known construction and described in the above-referenced patent and patent application. A pair of shielded conductive wires generally designated with reference numeral 30 is connected at the slider end 25 to suitable electrical contact members for the purpose of electrically coupling the thin film transducer on slider 25 with the follow on disk drive electronics. For this purpose, wire pair 30 passes upwardly along the central portion of flexure member 10, is secured by means of a tab 32 formed in an aperture 33 in floor portion 18, is secured by a pair of edge tabs 35, 36 and passes to the left of upper mounting end 12 of flexure member 10.

In order to increase the signal amplitude of the electrical signals provided by the transducer mounted on slider 25, a signal booster element is connected to the wire pair 30 along the path from the transducer slider 25 to the upper region of the mounting end 12. As best seen in FIG. 3, the signal booster element is actually encased in a sheath 36 surrounding the wire pair 30 as suggested by the dotted lines inside the solid sheath 36. Sheath 36 is preferably an electrically insulative tubing which can be heat shrunk in order to snugly surround the transformer located thereinside.

Figure 4:
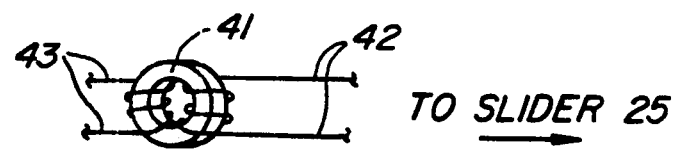
FIG. 4 is an enlarged illustration of a torus transformer with two separate coils.

FIG. 4 shows a first type of signal booster element which comprises a ferrite core transformer suitable for incorporation into the sheath 36 of FIG. 3. As seen in FIG. 4, the transformer has a ferrite core 41 shaped as a torous and a pair of separate coil windings terminating in a pair of conductive leads: a first pair 42 which leads to the transducer mounted on slider 25 and a second pair 43 which leads to the follow on electronic circuitry in the associated disk drive.

Figure 5:
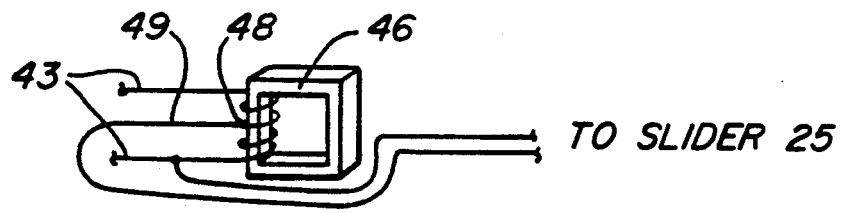
FIG. 5 is an illustration of a square transformer with a single coil having an intermediate tap connection.

FIG. 5 shows a second signal booster element which comprises a transformer configured as a square ferrite core transformer 46 and having a single coil winding about one leg with an intermediate tap 48. The winding pair 43 in this embodiment serves as the pair of conductive wires connected to the follow on electronic circuitry; while the center wire 49 connected to the intermediate tap 48 and one of the two wire pairs 43 are connected to the transducer on the slider 25. In FIG. 5, the second conductive wire connected to the transducer is shown as the bottom one of the pair 43: it is understood, however, that this illustrative only and that the upper wire may serve this same function, as desired.

The transformer is connected using conventional wiring techniques, and, preferably, the wire pair 30 is separately prepared, and then mounted on flexure member 10, after which the transducer ends of the wire pair 30 can be bonded to the transducer contacts on slider 25.

By incorporating the signal booster element in the wire pair 30, the voltage signals output from the transducer on slider 25 in the course of a read operation can be boosted as a function of the turns ratio of the transformer signal booster element. Since the signal booster element can be inserted into the conventional twisted wire pair 30, no special transducer or slider configuration is necessitated by the invention.

While the above provides a full and complete disclosure of the preferred embodiments of the invention, various modifications, alternate constructions and equivalents may be employed without departing from the spirit and scope of the invention. For example, while the preferred embodiment employs the ferrite core transformers illustrated in FIGS. 4 and 5, if desired an integrated circuit amplifier could also be used as the signal boost element. In addition, although the preferred embodiment employs the sheath 36, if desired the transformer may be covered with some other type of insulator and may be separately bonded to an appropriate portion of the flexure member 10. In addition, the invention can have application beyond the field of disk drives and may be employed with other types of magnetic recording/reproducing devices, such as tape drives. Therefore, the above should not be construed as limiting the invention, which is defined by the appended claims.

What is claimed is:

1. In a magnetic transducer suspension assembly having a slider mounted on one end of a flexure member, a transducer carried by the slider, and a plurality of conductive elements electrically coupled to the transducer and extending along the flexure member between the slider and the other end of the flexure member, the end of the conductive elements adjacent the other end of the flexure member comprising the output end thereof; the improvement comprising a signal booster element electrically coupled to said plurality of conductive elements and located in the region between said one end and said other end of said flexure member.

2. The invention of claim 1 wherein said signal booster comprises a miniature transformer having a first coil portion coupled to said transducer and a second coil portion coupled to said output end of said plurality of conductive elements.

3. The invention of claim 2 wherein said first coil portion and said second coil portion each comprises a separate coil.

4. The invention of claim 2 wherein said first coil portion and said second coil portion comprise a single coil with an intermediate tap connection.

5. The invention of claim 1 wherein said signal booster element is enclosed by an electrically insulative sheath.

6. The invention of claim 5 wherein said sheath is formed from a heat shrink tubing material.

7. A coupling assembly for use in mechanically suspending a slider/thin film transducer assembly from an actuator in a disk drive apparatus and for electrically coupling the thin film transducer to follow-on electronic circuitry, said coupling assembling comprising:

a flexure member having a first end for mechanically mounting a slider/transducer assembly and a second end for securement to a disk drive actuator; and a conductive wire assembly comprising a plurality of conductive wires carried by said flexure member, each wire having a first end located adjacent the first end of said flexure member and adapted to be connected to a thin film transducer and a second end located adjacent said second end of said flexure member and adapted to be connected to the follow-on electronic circuitry, and a signal booster element carried by said flexure member and coupled to said plurality of conductive wires, said signal booster element being positioned along said flexure member between the first and second ends thereof.

8. The invention of claim 7 wherein said signal booster element comprises a miniature transformer having a first coil portion coupled to said first end and a second coil portion coupled to said second end.

9. The invention of claim 8 wherein said first coil portion and said second coil portion each comprises a separate coil.

10. The invention of claim 8 wherein said first coil portion and said second coil portion comprise a single coil with an intermediate tap connection.

11. The invention of claim 7 wherein said signal booster element is enclosed by an electrically insulative sheath.

12. The invention of claim 11 wherein said sheath is formed from a heat shrink tubing material.

* * * * *